sten et al.

United States Patent [19]
Orensten et al.

[11] 3,722,685
[45] Mar. 27, 1973

[54] AQUATIC FILTRATION SYSTEM

[76] Inventors: Henry E. Orensten; Vivian C. Orensten, both of 2648 Inglewood Avenue, St. Louis Park, Minn. 55416

[22] Filed: May 28, 1971

[21] Appl. No.: 147,856

[52] U.S. Cl. ..................................210/169
[51] Int. Cl. ..................................E04h 3/20
[58] Field of Search........................210/169

[56] References Cited

UNITED STATES PATENTS 3,688,907  9/1972  Oravec ..................................210/169
2,672,845  3/1954  Schneithorst ..................210/169 X
3,490,416  1/1970  Kelley et al. ..................210/169 X Primary Examiner—Samih N. Zaharna
Assistant Examiner—T. A. Granger
Attorney—Thomas M. Meshbesher

[57] ABSTRACT

The disclosed aquatic life support system provides an apertured flow control plate which defines a lower chamber of an aquarium tank. A filtered water return and a water intake means are both located within this lower chamber. A pump draws contaminated water through the intake and drives the contaminated water through a filter. The output side of the filter is connected to the water return underneath the apertured plate.

5 Claims, 3 Drawing Figures

PATENTED MAR 27 1973 3,722,685
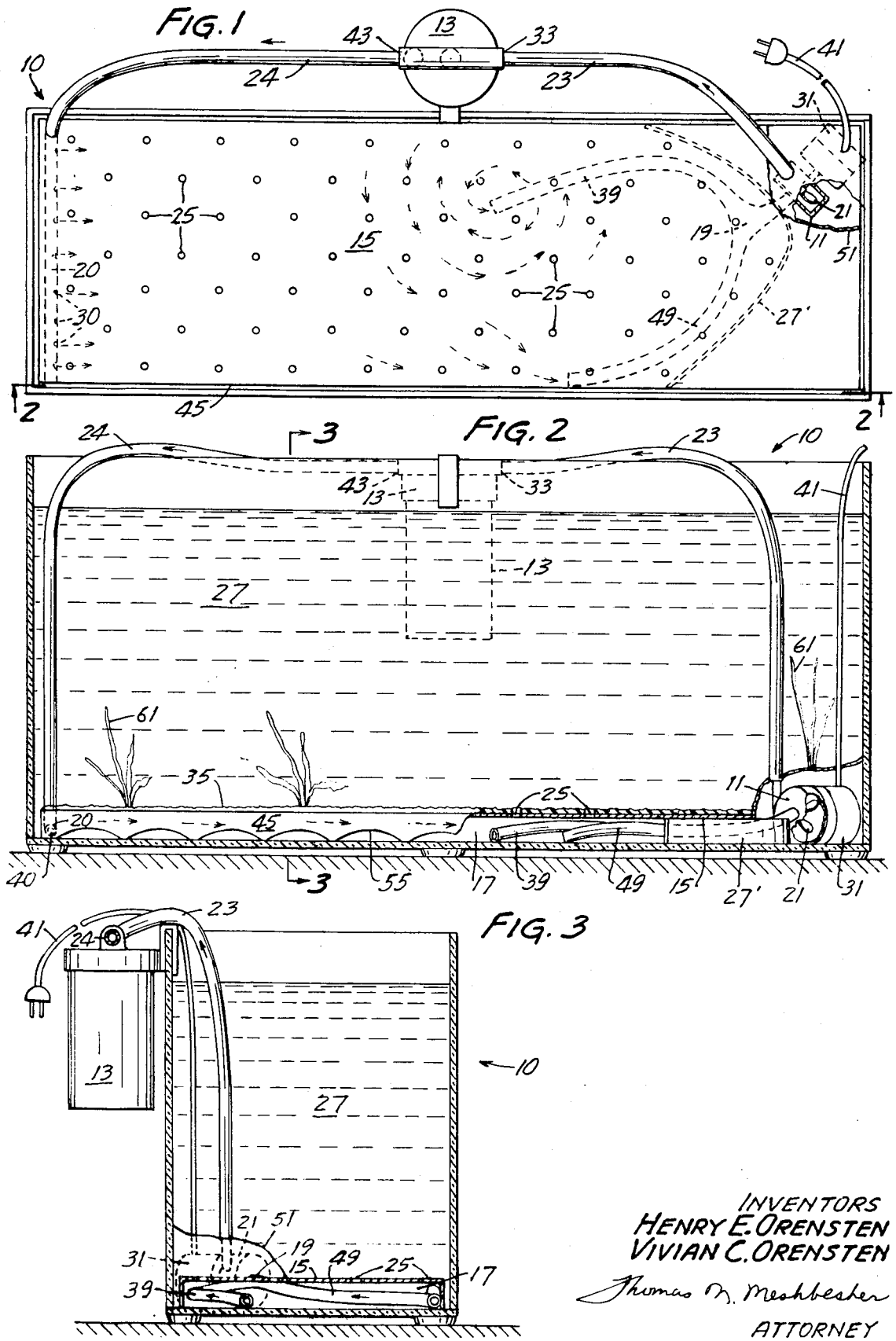
INVENTORS
HENRY E. ORENSTEN
VIVIAN C. ORENSTEN
Thomas M. Meshbesher
ATTORNEY

AQUATIC FILTRATION SYSTEM

FIELD OF THE INVENTION

This invention relates to aquatic life support systems such as aquariums, which provide a hospitable environment for aquatic animals such as fish. An aspect of this invention relates to an aquatic life support system containing a filtered, purified, aerated aqueous medium such as fresh water, salt water, or water containing various other minerals or, if desired, additives. A further aspect of this invention relates to home or hobby-type aquariums.

DESCRIPTION OF THE PRIOR ART

Aquatic life support systems, particularly for home aquariums of, for example, up to 30 or 40 gallon capacity, are of two general types. The most common type uses an air flow action (usually in combination with a gravity or siphoning action) to induce circulation of the aquarium water through a filtration means. The filtration means is supposed to remove decayed or excess fish food, fish excrement, and other contaminants which can be injurious to the health of fish or other aquatic life. Regardless of whether the air flow action creates water flow by a bubbling action or other air pressure or expansion effects alone or in combination with gravitation forces, it is a common characteristic of these systems that the pump element (impeller or positive displacement means) exerts force on air rather than water.

The air pump-induced water circulation created by these systems can be strictly internal, i.e., within the aquarium tank, where the water passes through a gravel or under-gravel filter, or can be conducted through or siphoned into a filter unit located outside the tank. In most embodiments of the internal circulation method, anaerobic or aerobic bacteria in a gravel bed or porous filter element are supposed to destroy wastes and purify the water. However, even assuming maximum efficient use of bacterial action, a build up of wastes in the water is inevitable and, at some point in time, the water in the aquarium tank will have to be replaced with fresh water and, furthermore, the gravel or filter element may have to be cleaned. The aforementioned external circulation method has the advantage that the filter medium is outside the main aquarium tank and can be periodically replaced without changing the water. However, due to the slow rate of circulation inherent in any air-induced water flow system, waste build up can still occur and necessitate cleaning of the tank and replacement of the water with fresh water. Thus, it is generally true of air-pump induced water circulation methods that failure to clean the tank at frequent intervals of days or weeks substantially increases the risk of illness in the aquatic animals, overfeeding of fish, and the growth of parasites and tank fungi or algae.

It has generally been recognized that water-pump induced circulation is far more efficient than the air-induced circulation systems discussed previously. In water pump systems, the pump element (impeller or positive displacement means) exerts force directly on an incompressible fluid; therefore, the force is transmitted through the system with little or no loss other than that due to fluid friction. The entire body of water in the tank can be mechanically forced through the filter, eliminating the need for reliance on gravitation forces, expansion of air bubbles, bacterial action, or other hard-to-control factors. However, several problems are encountered in using the water pump approach.

First, the fluid intake from the suction side of the pump may be rapid and voluminous enough to draw small species of aquatic life (e.g., tropical fish) out of the tank and into the filter.

Second, even a water pump action may be insufficient to suck up all the sediment (fish excrement, etc.) in the tank. Sediment can still collect in stagnant areas, in gravel beds, around vegetation, etc. Or on the other hand, elimination of gravel and vegetation from the tank would involve too great a sacrifice of aesthetic appearance to justify the improved sediment collection that might be obtained. The aesthetic problem is particularly acute when the high efficiency system involves bulky pump and/or filter-aerator units which must be disguised or covered up.

Third, highly efficient water pumps (above 50 gallons/hour capacity) can create strong currents in the tank which are disturbing to some species of aquatic life, e.g., tropical fish. The primary use of these high efficiency, high flow rate systems is in large, restaurant-type tanks for large fish, crustaceans, or other aquatic animals which are insensitive to strong currents.

In both internal circulation systems and re-circulating systems with externally located filters, it has been suggested to use an apertured base plate to support a gravel bed so that water can more easily flow up or down through the gravel. These base plates, when covered with gravel, can provide an aquarium with a good aesthetic appearance and can facilitate filtering by or cleansing of the gravel, but they also add to fluid flow resistance or pressure loss, particularly when the apertures in the base plate become plugged or clogged with dislodged gravel or floating sediment. Since the pressure drop across the gravel bed and supporting plate is directly proportional to the average flow rate (based on the cross-sectional area of the gravel bed), a system using a water pump would place high pressure demands on the pump due to the pressure loss across the apertured base plate and gravel bed.

Accordingly, this invention can provide an aquatic life support and display apparatus and system with several desirable features: the combination of aesthetic appeal with high filtering efficiency and reliable control over aquatic environmental factors; a high efficiency water-pump system which can completely purify the aqueous medium in an aquatic life support system in a matter of minutes or hours and maintain purity and non-toxicity in the system more or less indefinitely (without pouring out and replacing the water in the system), thereby preventing waste buildup, overfeeding of aquatic animals, incidence of fish illness, and growth of parasites, fungi, algae, and bacteria; an aquatic life support system containing a filter element which can easily and economically be replaced at frequent intervals without disturbing the operation of the system; furthermore, a high efficiency, high flow rate filtration system for an aquarium or the like wherein the fish are not disturbed by turbulence or swift currents, where small fish are not sucked out of the tank into the filter, where a sediment collection chamber is provided separate from, but freely exchangable with the display area for the fish such that a vortex in the sediment collection chamber prevents waste build-up due to stagnant areas, and where the gravel bed in the tank is either immobilized and shallow or simulated with a molded sheet, thereby reducing the fluid flow resistance of the system. This invention can also provide an aquatic life support system which can be installed without modifying existing types of aquarium tanks and which is extremely easy to maintain and service.

SUMMARY OF THE INVENTION

Briefly, this invention involves the use of a standard aquarium tank and an apertured housing means or flow control plate which defines a lower chamber wherein pure water is discharged and contaminated water is removed at a rapid flow rate, the unobstructed apertures in the housing serving to permit flow of sediment and contaminated water into the lower chamber and flow of pure water out of the lower chamber into the main body of the tank. To be effective, it has been found the contaminated water should be drawn out with a water pump having a capacity of at least 5 times the total liquid volume in the tank per hour, preferably about 7–15 times per hour. Both centrifugal and positive displacement water pumps of the appropriate capacity can be used, but centrifugal pumps are preferred. As is known in the art, a water pump can be located outside the aquarium tank, but it is preferred to use a submersible pump which is placed on or near the bottom of the tank and camouflaged by a decorative means such as real or artificial vegetation, a real or artificial rock formation, etc.

The bottom of the tank and the apertured housing means define the aforementioned lower chamber, which preferably contains about 3 to about 10 percent of the total volume of the tank. Since both the water flow intake (i.e. outlet) and the water flow return i.e. inlet are located within this lower chamber, the flow of water through the chamber is rapid and unimpeded. By a process of convergent and divergent flow mechanisms, the water in the large upper or main chamber (where the aquatic animals live—these animals are excluded from the lower chamber by the housing means) exchanges with the water in the lower chamber through the apertures in the apertured housing means. This exchange is complete and continuous (so long as the water pump is running), but creates relatively slow currents and little or no turbulence in the large upper chamber. Therefore, divergent diffusion currents passing through the apertures of the housing from the water return in the lower chamber bring a constant supply of filtered water to the aquatic animals without disturbing them; while convergent currents from the large upper chamber pass through the apertures into the water intake, carrying excrement and sediment out of the tank and into the filter. Sediment does not build up on the upper surface of the housing means; so long as the water pump is running, the sediment is drawn through the apertures into the lower chamber and the water outlet. The aesthetic appearance of the housing means is enhanced by a simulated gravel layer or other decorative means (including vegetation, if desired), but there is preferably no gravel bed as such anywhere in the aquarium tank. A preferred feature of this invention is to arrange the water outlet and inlet means, preferably with a baffle behind the outlet means, so as to induce at least one vortex near the intake in the lower chamber. This vortex prevents the formation of stagnant areas in the lower chamber water flow, thus insuring that sediment will not accumulate on the bottom of the lower chamber but be swept into the water outlet.

Several types of water filters are suitable for use in this invention, the preferred type comprising a vertical cannister with a removable filter core. The filter is preferably mounted outside of the tank to facilitate easy and convenient replacement of the core.

BRIEF DESCRIPTION OF THE DRAWING

The invention can be more easily understood by referring to the drawing, wherein:

FIG. 1 is a plan view of the aquatic life support system of this invention;

FIG. 2 is a sectional view taken substantially along line 2—2 of FIG. 1, but with parts broken away to reveal the structure of the water outlet means;

FIG. 3 is a sectional view taken along line 3—3 of FIG. 2.

DETAILED DESCRIPTION

In the following discussion of the drawing, like reference numerals denote like parts in all three of the views.

The basic elements of the system, as can be seen from FIGS. 1 and 2, are an aquarium tank 10, in this case a thirty gallon tank, a centrifugal water pump 11 of 200 gallons per hour capacity, a filter 13, an apertured housing means 15 defining a lower chamber 17 (FIGS. 2 and 3) and serving as a flow control plate, a substantially Y-shaped water outlet means 19, a filtered-water inlet means 20, and conduit means 23 and 24 connecting pump 11 to filter intake or inlet 33 and filtered-water inlet means 20 to filter discharge or inlet 43. A substantially V-shaped baffle means 27' (more easily seen from FIG. 1) in lower chamber 17 assists in the formation of a vortex around at least one of the legs 39 and 49 (ordinarily leg 39) of Y-shaped outlet means 19. Tank 10 and the upper surface 35 of flow control plate or apertured housing means 15 defines an upper chamber 27 which is the environment for the aquatic animals, e.g., fish. Apertures or perforations 25 (FIGS. 1 and 2) permit filtered water to flow from inlet 20 to diffuse into upper chamber 27 and also permit decayed food, fish excrement, etc. to pass into lower chamber 17, where it is sucked into the vortex about leg 39 and/or directly into outlet 19; in either event this waste material is drawn from the lower chamber 17 by the suction side of pump 11 and deposited in the filter element of filter 13, so that clean water is returned to the tank via conduit 24 and inlet 20. Legs 39 and 49 are arched slightly to permit a vortex to swirl about them.

Pump 11 and outlet 19 communicate with lower chamber 17, and pump 11 is covered up by a box-like simulated rock 51 and artificial vegetation 61. Thus, pump 11 in no way detracts from the appearance of the system. Pump 11 is a conventional submersible centrifugal pump comprising an impeller housing 21 and a submersible, water-proof electric motor housing 31 which can be connected to a line current source via water-proof electric cord 41. The water-proofing of pump 11 is by the conventional means: the motor is hermetically sealed in an oil bath within motor housing 31 and cord 41 has an outer sheath of rubber.

Filter 13 can be of any suitable conventional design, provided the filter element can withstand high pressures and rapid flow without causing an excessive pressure drop in the recirculating water flow. As sediment builds up in the filter, the pressure drop, of course, increases, and the filter core can be replaced as often as is convenient and economically feasible. For this reason the filter has an easily removable cylindrical cartridge or core (not shown) which can comprise cellulose, fiberglass, charcoal packed within a cylindrical mesh support, or the like. The top of the filter cannister is thus, for example, a threaded member, like that of the filter described in U.S. Pat. No. 3,262,570, issued July 26, 1966 (Gailitis et al.), but it is also permissible to design the filter case with its own threaded sleeve to permit removal of the core while the top is in place. It is also within the scope of this invention to provide filter 13 with an aeration intake so that the water or aqueous liquid flowing from inlet 20 will be aerated. Alternatively, a conventional aerator (not shown) can be included in the system as a separate element. A conventional water heater (not shown) can also be used, if desired. A further modification of this invention involves the use of a second filter discharge tube, as will be explained subsequently.

Conduit 24 is connected to or integral with inlet 20, which is a tube laying alongside a wall of tank 10 in lower chamber 17 and is provided with discharge orifices 30 (FIG. 1). The end 40 of inlet 20 is preferably stoppered or sealed so that orifices 30 discharge all the water which flows into inlet 20.

In an alternative embodiment of this invention, a second return means, connected to the output or discharge side of filter 13 (or, less preferably, to conduit 24) is located on top of surface 35, inside upper chamber 27. This second return means is provided with a shut-off valve which is opened when surface 35 needs to be cleaned by a water flow action. In the system of this invention, surface 35 rarely, if ever, collects sediment; hence, this alternative embodiment is not ordinarily essential to achieving the objects of this invention.

The flow control plate or apertured housing means 15 is not used to support a sand or gravel bed, since a bed of particles on its surface could interfere with the operation of this invention. For a pleasing aesthetic effect, top surface 35 (and side surface 45) of housing means 15 simulates a gravel bed by having a grainy or cobbled molded plastic surface, as can be seen from FIG. 2. (For convenience of illustration, the cobbled effect is not shown in FIG. 3.) Any plastic which is non-toxic to aquatic animals can be used, including poly(methylmethacrylate), polysiloxanes, polytetrafluoroethylene, polyolefins, etc. These plastics, as either rigid or elastomeric materials, can be used for many of the other elements of this invention where such use is economically favorable, e.g., for conduits 23 and 24. Coatings of hydrophobic plastics can be used on surfaces in contact with water flow (e.g., the bottom of tank 10) to reduce fluid friction. An alternative form of decorative surfacing for surface 35 (and side surfaces 45) is a mono- or bi-layer of gravel, sand, or other granules or particles which are immobilized with an adhesive or the like. This decorative surface can be economically provided by standard particle coating techniques analogous to the techniques of sandpaper manufacture. Since the coating of particles is glued to surfaces 35 and 45, there is no danger that these particles will inadvertently be sucked into or through apertures 25, archways 55 and/or into outlet 19. The coating of particles should preferably be a monolayer to avoid sediment build-up and reduce fluid friction.

The apertures 25 in flow control plate or housing means 15 can be any desired size (e.g., 1–10 mm), provided they are small enough to prevent fish from being drawn into lower chamber 17 and small enough not to be detrimental to the appearance of housing means 15, but large enough to keep fluid friction within desired limits and to permit larger pieces of sediment to be readily drawn into lower chamber 17.

Side surfaces 45 are provided with open archways 55 (FIG. 2) which permit sediment trapped between the walls of tank 10 and surfaces 45 to be drawn into the lower chamber 17 and intake 19. It is permissible to modify the invention by sealing housing means 15 around its upper periphery, in which case archways 55 are unnecessary. However, it is generally easier to use the housing means design shown in the drawing, so that the necessity of an exact fit in tank 10 is avoided. The previously described V-shaped baffle means 27' is preferably integral with housing means 15.

In the operation of this invention, the flow of filtered water emerging from inlet means 20 causes a convergent flow for about the first one-fourth to one-half of the length of the left-hand portion of tank 10, as is shown in FIG. 2. The converging currents from upper chamber 27 pass freely through apertures 25 and do not create noticeable turbulence in either chamber. These converging currents bring heavier-than-water wastes into lower chamber 17. Due to the force of gravity, these wastes seldom are forced back into chamber 27 and usually collect on the bottom of tank 10 where they are drawn into a vortex and ultimately into outlet 19. If waste is forced back up into chamber 27 by divergent flow of water from lower chamber 17, it is always eventually brought back into chamber 17 and outlet 19 so long as the vacuum cleaner-like action of pump 11 continues. Surprisingly, it has been found that pump 11 can recirculate the water or other aqueous liquid in tank 10 in about one hour often enough to completely clean up the entire body of water in tank 10. This rapid cleaning action permits the pump/filtration system to lay idle for about most of the day, with a consequent saving in electricity.

In the right-hand half of the tank (FIG. 2), the flow of water in lower chamber 17 is divergent to some extent, causing diffusion of filtered water through aperture 25 into upper chamber 27. This fluid exchange between chambers 17 and 27 provides rapid and efficient water purification without an excessive pressure drop across surface 35 or turbulence in chamber 27. The diffused filtered water in chamber 27 may pick up some sediment, but this sediment will also be brought by gravity or by the convergent flow into lower chamber 17. Accordingly, pump 11, through outlet 19, continually collects and forces sediment through conduit 23 into filter 13, where it is retained. As a result, the water flowing from filter 13 to inlet means 20 is fully purified.

The elimination of a multi-layer gravel or sand bed from the aquarium system of this invention — with no loss of the aesthetically pleasing appearance of the aquarium — is a very useful feature of this invention. It is known that the pressure drop across a bed of packed granules is directly proportional to the depth of the bed and the average velocity of the water flow based on the cross-sectional area of the bed and inversely proportional to the porosity of the bed and its "hydraulic radius." This invention substitutes an apertured housing means and convergent/divergent flow therethrough for direct flow through a sand or gravel bed. The result is decreased depth of the "bed" (i.e., surface 35 of flow control plate or housing 15), increased porosity, and a vastly increased "hydraulic radius." (Hydraulic radius is inversely proportional to the square of the surface-to-volume ratio of particles in a sand or gravel bed). The result is a low pressure drop, which permits much faster water flow while still providing the appearance and the aesthetic appeal of a simulated gravel bed and a low level of disturbing water movement in the aquatic life environment. Thus, it is an extremely beneficial feature of this invention that both the water outlet and filtered-water inlet are inside an apertured flow control plate or housing means defining a lower chamber.

Many modifications of this invention will occur to the skilled technician from the foregoing illustrative disclosure. The scope of this invention is to be determined by the claims which follow.

We claim:

1. A purification system for cleansing the water in an aquarium tank comprising, in combination:
    a. a tank with a bottom, side walls, and an open top, said tank being constructed and arranged to hold a body of water,
    b. a flow control plate horizontally disposed above the bottom of said tank defining a first chamber within said tank above said plate and a second chamber within said tank beneath said plate and above the bottom of said tank,
    c. perforations in said flow control plate constructed and arranged whereby unfiltered liquid may flow into said second chamber from said first chamber by passing through said perforations,
    d. first nozzle water inlet means located at a first end of said second chamber and arranged to direct water the length of said second chamber and parallel to the bottom thereof,
    e. outlet means located at a second end of said second chamber opposite said inlet means and arranged to receive water directed thereto by said inlet means,
    f. filter medium means within a closed filter container with an inlet and outlet and located externally of said tank with the inlet to said container in fluid communication with said second chamber outlet means,
    g. pump means in communication with the outlet of said filter container and said first nozzle water inlet means whereby flow of water from said inlet means to said outlet means within said second chamber induces flow from said first chamber to said second chamber through said flow control plate.

2. Purification system according to claim 1 wherein said pump means has a capacity of at least 5V per hour, where V is the volume of the body of water in said tank.

3. Purification system according to claim 1 wherein:
    a. said tank is horizontally elongated,
    b. said second chamber contains at least about 3 percent of the total volume of the tank, and said second end of said second chamber is defined by a vertically extending baffle means,
    c. said perforations in said flow control plate are about 1–10 millimeters in size, and
    d. said outlet means comprises a branched conduit having apertures in the branches thereof.

4. Purification system according to claim 3 wherein said water inlet means is an apertured conduit positioned along said first end of said second chamber; said outlet means is a Y-shaped conduit with a water receiving aperture at the tip of each branch of the Y, the tip of at least one of the branches being positioned adjacent a side wall of said tank; and said baffle means is a V-shaped wall interposed between one extreme end of the tank and said outlet means.

5. Purification system according to claim 3 wherein said water inlet means and said outlet means are spaced apart more than half the elongated horizontal dimension of said tank.

* * * * *